United States Patent [19]

Tatami

[11] 4,257,073
[45] Mar. 17, 1981

[54] QUASI-VERTICAL SYNCHRONIZING SIGNAL GENERATOR

[75] Inventor: Mitsushige Tatami, Ebina, Japan

[73] Assignee: Sony Corporation, Tokyo, Japan

[21] Appl. No.: 27,406

[22] Filed: Apr. 5, 1979

[30] Foreign Application Priority Data

Apr. 6, 1978 [JP] Japan .................................. 53-40726

[51] Int. Cl.³ .............................................. H04N 5/78
[52] U.S. Cl. ..................................... 360/10; 360/36; 360/37; 360/77; 360/78
[58] Field of Search .................... 360/9, 10, 36, 37, 35, 360/38, 77, 78, 11

[56] References Cited

U.S. PATENT DOCUMENTS

| | | | |
|---|---|---|---|
| 3,869,709 | 3/1975 | Yamagishi et al. | 360/10 |
| 4,133,009 | 1/1979 | Kittler et al. | 360/9 |
| 4,139,867 | 2/1979 | Foerster | 360/10 |
| 4,167,762 | 9/1979 | Hashizaki et al. | 360/77 |
| 4,203,138 | 5/1980 | Elenbaas | 360/37 |

OTHER PUBLICATIONS

"Schaltbeispiele"–Siemens, 1976/77, pp. 48–51.

*Primary Examiner*—James W. Moffitt
*Assistant Examiner*—Donald McElheny, Jr.
*Attorney, Agent, or Firm*—Lewis H. Eslinger; Alvin Sinderbrand

[57] ABSTRACT

A quasi-vertical synchronizing signal generator is disclosed, for use with a helical scan video tape recorder (VTR) to generate a quasi-vertical synchronizing signal during a special video effects reproducing operation, which signal occurs at the same relative location during the scanning trace of the reproducing head even if the effective length of that trace varies in accordance with the special video effects then in operation. A signal is produced when the head reaches a pre-established location in the track which it is scanning, and then a delayed signal, which is delayed from the time that the head reached the pre-established location, is generated, this delayed time being selectable as a function of the particular special video effect which has been selected for operation. The delayed signal constitutes the quasi-vertical synchronizing signal. If the selected special video effect results in a longer-than-normal effective length of the scanning trace, then the quasi-vertical synchronizing signal is produced with a greater delay than if the selected special video effect results in a scanning trace of smaller-than-normal effective length.

13 Claims, 5 Drawing Figures

QUASI-VERTICAL SYNCHRONIZING SIGNAL GENERATOR

BACKGROUND OF THE INVENTION

This invention relates to video tape recorders (VTR's) and, more particularly, to the generation of a quasi-vertical synchronizing signal when a VTR is operated in its reproducing mode, which quasi-vertical synchronizing signal is timed to occur at a predetermined relative location in the scanning trace of the VTR reproducing head, regardless of the effective length of that trace which may vary from a normal length in accordance with a selected special video effect.

In a helical scan video recording system, such as the so-called omega-type VTR, wherein a single head is used to scan parallel successive record tracks across a magnetic tape which is deployed about a guide drum in a shape resembling the Greek letter $\Omega$, or in a two-head VTR, the scanning trace of the head during a normal recording operation is at a slant, or angle, with respect to the longitudinal direction of the moving tape. Because of this configuration, the parallel tracks which are recorded on the tape are skewed with respect to the direction of tape motion. In general, each track contains a field of video signals and, thus, each track contains successive horizontal line intervals which are divided, broadly, into the video signal information portion and the vertical blanking interval of the field of video signals. In the NTSC system, each track, that is, each recorded field of video signals, contains 262.5 horizontal line intervals.

During a normal reproducing operation, the scanning trace of the reproducing head is in substantial alignment with each recorded track. Recently, a so-called bimorph assembly, which contains a piezo-ceramic leaf assembly which is responsive to control voltages applied thereto to deflect, or bend, has been provided as a support element for the head. In the event that, during the normal reproducing operation, the scanning trace varies from the recorded track, the bi-morph assembly is controlled so as to deflect in a manner which brings the head into substantial coincidence with the recorded track. This dynamic adjustment of the head during a normal reproducing operation can be turned to account so that the head can be aligned with selected tracks during special video effects operations, such as stop motion, fast forward motion and reverse motion.

When using a VTR for a signal reproducing operation, particularly of the broadcast quality type, the reproduced video signal generally is supplied through a time base corrector in order to correct for various time base errors which may be derived from the VTR, these errors being of the type which introduce undesired jitter or color distortion into the video picture which ultimately is reproduced. A typical time base corrector stores a number of reproduced line intervals, and then reads out these stored line intervals at a standard read-out frequency. In order to insure that the read out video signals from the time base corrector are in the proper vertical phase, that is, the first or top line is read out in proper vertical phase synchronism so as to appear at the top of the video picture, the read-out operation of the time base corrector generally is synchronized with the vertical synchronizing signal which is reproduced by the VTR. If the vertical synchronizing signal of the original video signal is recorded during the end portion of each scanning trace, then, during the normal reproducing operation, the time base corrector is synchronized with this vertical synchronizing signal to read out the first stored line of video information at some predetermined time following its reproduction. For example, if the recorded vertical synchronizing signal precedes the first line of video information by about twelve horizontal line intervals, the time base corrector is synchronized to read out this first line of video information at a delayed time equal to twelve horizontal line intervals following the reproduction of the vertical synchronizing signal.

While this control over the time base corrector generally is satisfactory for a normal reproducing operation, it suffers from some deficiencies when the VTR is operated in a special video effects mode, such as stop motion, fast motion or reverse motion. During such a special video effects mode of operation, the tape speed is changed from its normal speed. For example, for stop motion the tape is stopped so as to permit the head to scan the same recorded track a number of times. For fast motion, the tape is moved in its forward direction at a faster-than-normal speed so that the head scans only alternate tracks (for 2× motion) or every third track (for 3× motion), or the like. For reverse motion, the tape is moved in the reverse direction, and each recorded track is scanned. During such special video effects, the effective length of the scanning trace of the head as it scans a particular track differs from its normal length. For example, for stop motion, the effective length of the scanning trace along the one recorded track which is scanned thereby is longer than its normal effective length and, therefore, is longer than the length of the scanned track. Similarly, if the VTR is operated in a reverse mode of reproduction, the effective length of the trace which is scanned by the head is still larger than its normal length and, therefore, is larger than the length of the track which it scans. Conversely, when the VTR is operated in its fast motion reproducing mode, the effective length of the scanning trace of the head now is less than its normal length and, consequently, this scanning trace is less than the length of the track which the head is scanning. Because of this varying effective length of the scanning trace of the head, the head will not reach the first, or top line of recorded video information at a time which is delayed by, for example, twelve horizontal line intervals from the reproduction of the vertical synchronizing signal. For longer-than-normal scanning traces, such as during stop motion or reverse motion operations, the head does not reach the first line of recorded video information until about 14.5 or 17 (or more) line intervals following the reproduction of the vertical synchronizing signal. This means that if the reproduced vertical synchronizing signal is used as a reference for reading out the first line of video information from the time base corrector, there will be a resultant vertical displacement in the video picture during these special video effects. For those special video effects in which the effective length of the scanning trace is greater-than-normal, such as during stop motion or reverse motion, the displayed video picture will appear to be shifted in the downward direction; and for those special video effects wherein the scanning trace is greater-than-normal, such as during fast motion, the video picture will appear to be shifted in the upward direction. Furthermore, during continued operation in the special video effects mode, the video picture will appear to vibrate in the vertical direction.

The aforedescribed problem is present either for those VTR systems in which the vertical synchronizing signal actually is recorded or in which only the vertical blanking interval is recorded. In the latter operation, although the vertical synchronizing signal per se is not reproduced, the vertical synchronizing signal is synthesized by counting the number of horizontal line intervals which the head scans, and then supplying a vertical phase synchronizing signal to the time base corrector after a predetermined number of such horizontal line intervals have been counted. However, if the effective length of the scanning trace is greater-than-normal, for example, if this length is equal to about 265 line intervals rather than the normal 262.5 line intervals, the vertical phase synchronizing signal supplied to the time base corrector will be premature. This will result in the same vertical displacement, or vertical vibration in the video picture, as described previously.

OBJECTS OF THE INVENTION

Therefore, it is an object of the present invention to provide improved apparatus which overcomes the aforenoted problems of the prior art.

Another object of this invention is to provide a quasi-vertical synchronizing signal generator which is particularly useful with a helical scan VTR that is operable in normal and various special video effects modes of operation.

A further object of this invention is to provide apparatus for use with a VTR in combination with a time base corrector for synchronizing the vertical phase of the video signals which are read out of the time base corrector and which ultimately are used to reproduce a video picture.

An additional object of this invention is to provide a quasi-vertical synchronizing signal generator for use with a helical scan VTR in which a quasi-vertical synchronizing signal is generated during each scan of a reproducing head, this quasi-vertical synchronizing signal having a time of occurrence which precedes the first line of video information that is reproduced during the next scan by a fixed predetermined amount, regardless of whether the VTR is operating in its normal or special video effects mode.

Various other objects, advantages and features of the present invention will become readily apparent from the ensuing detailed description, and the novel features will be particularly pointed out in the appended claims.

SUMMARY OF THE INVENTION

In accordance with the present invention, apparatus for generating a quasi-vertical synchronizing signal is provided for use with a helical scan VTR. The quasi-vertical synchronizing signal is produced at a predetermined location of the reproducing head, relative to the end of the scanning trace thereof, even if the effective length of that scanning trace along a recorded track varies from its normal effective length, such as during the production of special video effects, for example, stop motion, fast motion and reverse motion. A signal is produced when the head reaches a pre-established location in the track which it scans; and a delayed signal, delayed from the time that the head reaches its pre-established location, is generated, the delayed time being selectable as a function of the particular video effect which is selected. The delayed signal constitutes the quasi-vertical synchronizing signal. In one embodiment, the signal which is produced when the head reaches its pre-established location is the reproduced vertical synchronizing signal, which had been recorded in the track then being scanned. In another embodiment, the signal which is produced when the head reaches its pre-established location is generated by counting the number of horizontal synchronizing signals which are reproduced as the head scans the recorded track, and then producing a signal when a predetermined count has been attained.

BRIEF DESCRIPTION OF THE DRAWINGS

The following detailed description, given by way of example, will best be understood in conjunction with the accompanying drawings in which.

DETAILED DESCRIPTION OF A PREFERRED EMBODIMENT

Figure 1:
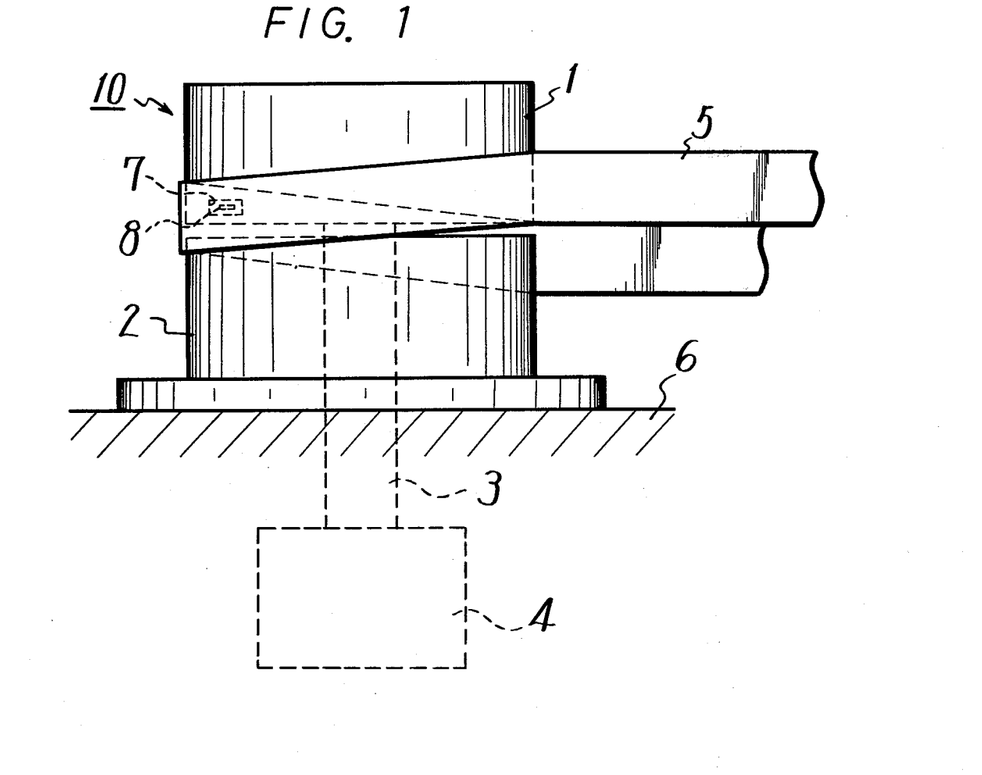
FIG. 1 is a schematic diagram showing a side view of an Ω-wrap helical scan VTR with which the present invention can be used.

Referring now to the drawings, and in particular to FIG. 1, there is illustrated schematically a side view of a so-called Ω-wrap VTR 10. It should be appreciated that, although an Ω-wrap VTR is shown and described herein, the present invention is equally applicable to the so-called two-head VTR.

In one type of Ω-wrap VTR, a single magnetic head is provided, and the magnetic tape is wrapped about the guide drum of the VTR through an angle that is almost 360°. When viewed from above, the configuration of the tape wrapped about the guide drum resembles the Greek letter Ω. As shown in FIG. 1, the VTR apparatus is comprised of an upper rotary drum 1 and a stationary lower drum 2. Upper drum 1 is coupled via a drive shaft 3 to a motor 4 so as to be rotatably driven thereby. Magnetic tape 5 is guided by suitable guide elements (not shown) obliquely about the upper and lower drums, as shown, with a wrap angle of almost 360°. The usual capstan, pinch roller and tape drive motor which are used to transport tape 5 are not shown. A window 7 is provided in upper rotary drum 1 through which a magnetic head 8 projects outwardly to be in good magnetic relation with tape 5. During a normal recording or reproducing operation, tape 5 is transported in its normal forward direction, at normal tape speed, while upper rotary drum 1 rotates such that magnetic head 8 scans parallel, skewed tracks across the tape. During the recording operation, video signals are recorded in these tracks; and during a reproducing operation, the previously recorded video signals are reproduced. As is typical, each track contains one field of video signals, this field containing the vertical blanking interval, formed of a predetermined number of line intervals, and the video information portion which is formed of a number of line intervals containing useful video information. Each line interval is defined by a horizontal synchronizing signal, and it is assumed that the NTSC system is followed wherein each recorded field interval contains 262.5 line intervals.

Figure 2:
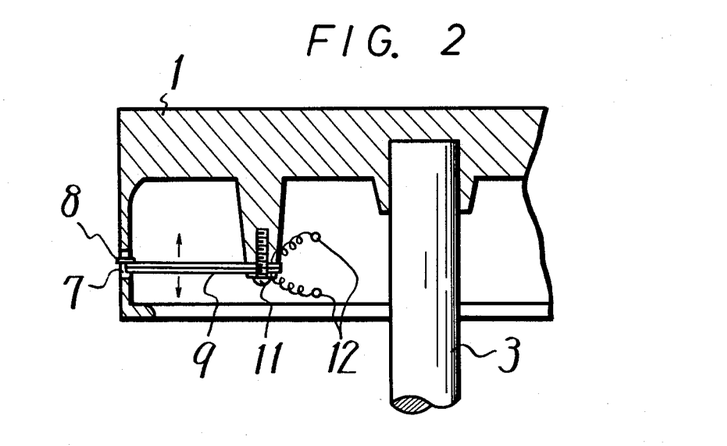
FIG. 2 is a sectional view of a scanning drum which can be used in the helical scan VTR, this view showing a bi-morph head mounting assembly.

Referring now to FIG. 2, magnetic head 8, which projects through window 7, is secured to upper rotary drum 1 by a bi-morph assembly 9. As is known, the bi-morph assembly is comprised of a pair of overlying piezo-ceramic leaf members which are electrically connected to output terminals 12 adapted to receive a control voltage applied thereacross. As shown in FIG. 2, one end of bi-morph support assembly 9 is secured via a screw (or screws) 11 to the upper rotary drum. Hence, the bi-morph support assembly, when supplied with a control voltage, bends or deflects in the directions indicated by the arrows. This, in turn, displaces head 8 in the upward or downward direction as the head scans successive record tracks across tape 5.

It is appreciated that this displacement of head 8 is transverse, or perpendicular, to the scanning trace thereof. Consequently, if there is a tracking error during a normal reproduction mode of apparatus 10, a correcting voltage supplied to bi-morph support assembly 9 results in dynamic correction of the scanning trace of head 8. That is, such a correction voltage brings head 8 into proper alignment with the record track then being scanned thereby. This dynamic tracking adjustment minimizes crosstalk interference and/or guard band noise which might otherwise be picked up by the head in the absence of this dynamic tracking correction.

Figure 3:
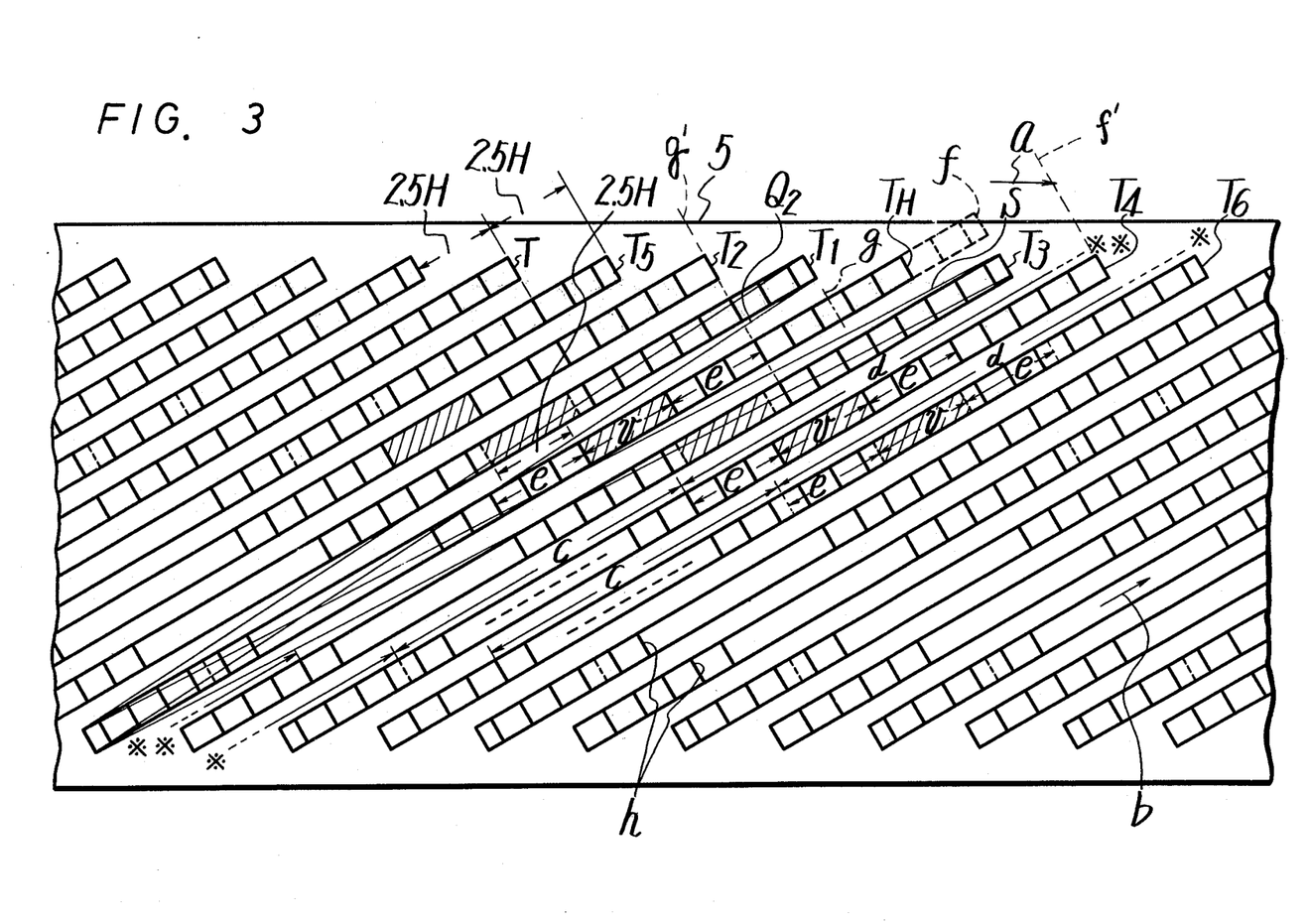
FIG. 3 is a schematic representation of skewed parallel tracks which are recorded in a helical scan VTR, and which is useful in explaining the operation of the present invention.

A schematic representation of the parallel, skewed record tracks which are recorded on tape 5 by head 8 is set out in FIG. 3. It is assumed that, during normal operation, the tape is advanced in the direction indicated by arrow a and head 8 scans in the direction indicated by arrow b so as to form the illustrated tracks. It is further assumed that adjacent tracks are separated by a guard band. Each track contains a field interval of video signals, and each field interval is constituted by a video information portion c and a vertical blanking interval portion d. When head 8 scans in the direction of arrow b, the vertical blanking interval d is recorded at the end portion of one track, and then is continued onto the beginning portion of the next adjacent track. As is typical, adjacent line intervals in the video information portion c and in the vertical blanking interval portion d are separated by a horizontal synchronizing signal h. To avoid undesired crosstalk caused by the horizontal synchronizing signal in an adjacent track, the record tracks T are recorded in so-called H-alignment. That is, the horizontal synchronizing signals are aligned from one track to the next. Each track has a field interval recorded therein and, therefore, in accordance with the NTSC standard, contains 262.5 horizontal line intervals. In order to maintain the aforementioned H-alignment, the beginning of one track is displaced, in the scanning direction, by 2.5 horizontal line intervals (i.e., 2.5 H) from the adjacent, preceding track. This displacement is a function of the movement of tape 5, synchronized with the rotation of head 8. The vertical blanking interval d is comprised of a set of equalizing pulses e, followed by the vertical synchronizing signal v, followed by another set of equalizing pulses e, and then completed by a number of "empty" line intervals until the end of the vertical blanking interval. As shown by adjacent tracks $T_3$ and $T_4$, for example, the last four horizontal line intervals included in vertical blanking interval d in track $T_4$ are recorded at the beginning portion of the next adjacent track $T_3$.

During a recording operation, successive tracks are recorded as follows: Track $T_6$, followed by track $T_4$, followed by track $T_3$, followed by track $T_H$, followed by track $T_1$, followed by track $T_2$, and so on. For the illustrated H-alignment, the end portions of adjacent tracks, such as tracks $T_3$ and $T_4$, are displaced from each other by 2.5 H; and, similarly, the beginning portions of these adjacent tracks likewise are phase displaced from each other by 2.5 H.

During a normal reproducing mode of operation, the respective tracks are scanned by head 8 in the same order in which they were recorded. Furthermore, the operation of bi-morph support assembly 9 adjusts the alignment of head 8 during each scanning trace thereof such that any tracking errors are dynamically compensated while the head scans the successive tracks. If a stop motion mode of operation is selected, tape 5 is maintained in a stationary position. Head 8 then scans the same track repeatedly. Let it be assumed that, for the stop motion mode of operation, track $T_H$ is selected to be scanned. Because of the angled relationship between tape 5 and the scanning trace of head 8, during this stop motion mode of operation, the head scans a trace S, which is assumed to begin at the beginning portion of track $T_H$ and then departs from this track so as to terminate at the end portion of adjacent, preceding track $T_3$. This displacement of scanning trace S relative to track $T_H$ is known, and is assumed to be substantially linear over the length of the trace. To compensate for this departure of scanning trace S from track $T_H$, a suitable sawtooth-shaped control voltage is supplied to bi-morph support assembly 9. As a result thereof, scanning trace S is dynamically corrected so as to be in alignment with track $T_H$. Consequently, during the stop motion mode of operation, head 8 scans track $T_H$ over the length of scanning trace S. This means that the length of the scanning trace of the head relative to track $T_H$ now extends to the point represented by the broken lines f. Once point f is reached, head 8 returns to the beginning portion of track $T_H$ to resume the scanning of this track. Hence, repeated scanning of track $T_H$ results as a stop motion video picture.

If it is assumed that the reverse motion mode of operation is selected, tape 5 is driven in the reverse direction, that is, the direction opposite to arrow a. The resultant scanning trace of head 8 extends from the beginning of track $T_H$ to the end portion of track $T_4$. This scanning trace is dynamically adjusted, as by supplying a suitable sawtooth-shaped voltage to bi-morph support assembly 9, such that head 8 scans track $T_H$, and then, after completing its scan of this track, head 8 proceeds to scan adjacent preceding track $T_3$. The corrected scanning trace of head 8 relative to track $T_H$ now extends to the point represented by the broken line f'. This is the effective length of the scanning trace during this reverse motion mode of operation. Once point f' along track $T_H$ is reached, head 8 will have been rotated back to the beginning portion of the next preceding track $T_3$. This track then is scanned to continue with the reverse motion mode of operation.

As another special video effect, let it be assumed that a 2× fast motion mode of operation is selected. For this fast motion mode, tape 5 is transported in the direction indicated by arrow a at twice its normal speed. The trace of head 8 across tape 5 during this mode of operation now appears as trace $Q_2$. That is, head 8 begins its trace in alignment with track $T_H$; but, because of the speed of tape 5 and the angular relationship between the rotary path followed by head 8 and the parallel record tracks on the tape, the scanning trace of the head during this fast motion mode of operation terminates at the end portion of track $T_1$. This displacement of trace $Q_2$ from track $T_H$ is substantially linear over the length of the trace. Therefore, to compensate for this displacement, a suitable saw-tooth-shaped control voltage is supplied to bi-morph support assembly 9. As a result of this control voltage, the scanning trace of head 8 is dynamically corrected so as to be in alignment with track $T_H$. The effective length of this scanning trace of the head terminates at the broken line g. At that time, that is, when head 8 reaches point g along track $T_H$, the rotation of the head returns it to the beginning portion of the next track to be scanned. In this assumed 2× fast motion mode of operation, after track $T_H$ is scanned by head 8, the next track to be scanned thereby is track $T_2$. Recorded track $T_1$ thus is passed over, or "skipped". By scanning only alternate tracks, the special video effect of 2× fast motion is produced in the video picture. It may be appreciated that, if a 3× fast motion mode of operation is selected, track $T_H$ is scanned, and then intermediary tracks $T_1$ and $T_2$ are passed over until track $T_5$ is scanned. Furthermore, during this 3× fast motion mode of operation, the effective length of the scanning trace of head 8 along track $T_H$ is represented by the broken line g'.

During a normal reproducing mode of operation, the video signals which are reproduced by head 8 from the illustrated tracks are supplied through a time base corrector in order to remove time base errors which would otherwise result in jitter, color distortion or the like. As mentioned previously, the first, or top line of video information, for example, the first horizontal line interval included in video information portion c, is read out of the time base corrector at a phase synchronized time such that it appears at the very top of the video picture. The phase synchronizing pulse which is supplied to the time base corrector for reading out this first line of video information is derived from the vertical synchronizing signal v which is reproduced from the scanned track. It is seen that a fixed number of line intervals is provided between the end of the vertical synchronizing signal v and the beginning of the video information portion c in the next adjacent track. Thus, during a normal mode of reproducing, a phase synchronizing read-out signal can be produced at a predetermined time following the reproduction of the vertical synchronizing signal v. This is because once head 8 reaches the pre-established location along a scanned track, such as track $T_H$, whereat vertical synchronizing signal v is recorded, the head reaches the beginning of the video information portion c in the next adjacent track within a predetermined, fixed time. However, if the effective length of the scanning trace of head 8 along track $T_H$ changes from its normal length, as during a special video effects mode of operation, then head 8 will not reach the beginning of the video information portion of the next track which is scanned thereby within the same predetermined, fixed time following the reproduction of the vertical synchronizing signal v. For example, let it be assumed that the stop motion mode of operation is selected. It is recalled that this results in a scanning trace along track $T_H$ having an effective length equal to that of scanning trace S. That is, during the stop motion mode of operation, head 8 scans track $T_H$ to the point f.

If the beginning of the video information portion c of track $T_H$ occurs at 12.5 horizontal line intervals following the vertical synchronizing signal v, it is appreciated that, when the effective length of the scanning trace is extended to the point f, then head 8 will not coincide with the beginning of the video information portion c at 12.5 line intervals following the vertical synchronizing signal v during this stop motion mode of operation. Accordingly, if the phase synchronizing signal which is supplied to the time base corrector for reading out the first line of video information therefrom is timed to occur at 12.5 line intervals following the vertical synchronizing signal v, the read-out operation of the time base corrector will be improperly phased during the stop motion mode of operation. That is, in the just-described operation, if the vertical synchronizing signal v is used as a reference to phase-synchronize the time base corrector, the last 2.5 line intervals included in the vertical blanking interval d will be read out as the top lines. This has the effect of vertically displacing the video picture, which ultimately is reproduced from these video signals, in the downward direction.

Similarly, if the reverse motion mode of operation is selected, the scanning trace of head 8 along track $T_H$ extends to the point f'. If the vertical synchronizing signal v which is reproduced from track $T_H$ is used as a reference to synchronize the reading out of the top line of video information from the time base corrector, it is appreciated that the last five line intervals included in the vertical blanking interval will be read out from the time base corrector and displayed as the top-most lines of the video picture.

If the 2× fast motion mode of operation is selected, the effective length of the scanning trace of head 8 along track $T_H$ is shortened to the point represented by g. If, under these circumstances, the vertical synchronizing signal v is used as a reference for reading out the first line of video information from the time base corrector, it is seen that the first 2.5 line intervals which are included in the video information portion c of track $T_2$ (the next track to be scanned) are not read out from the time base corrector. This is because, in the shortened scanning trace of head 8, only 5.5 line intervals are reproduced from track $T_H$ until the head reaches point g, rather than the seven line intervals which normally are reproduced from this track by head 8. This means that an additional 2.5 line intervals in the next scanned track (i.e., track $T_2$) must be reproduced therefrom until the readout signal is supplied to the time base corrector. As a result of this operation, the video picture which ultimately is reproduced during this 2× fast motion mode of operation appears to be shifted in the upward direction. It may be appreciated that this problem is further compounded if the 3× fast motion mode of operation is selected.

To summarize the foregoing special video effects modes of operation, if the effective length of the scanning trace along track $T_H$ is increased, the interval from the time that head 8 reaches the pre-established location at which the video signal v is recorded until the head reaches the beginning of the video information portion in the next trace thereof is increased, or delayed, by an amount equal to the increase in the effective length of the scanning trace. Conversely, if the effective length of the scanning trace along track $T_H$ is shortened, the interval from the time that head 8 reaches the pre-established location at which the video signal v is recorded until the head reaches the beginning of the video information portion of the next track scanned thereby is reduced. For the stop motion mode, the effective length of the scanning trace of head 8 is increased by 2.5 H. A delay equal to 2.5 H must be added to the vertical phase synchronizing signal which is supplied to the time base corrector in response to the vertical synchronizing signal v. For the reverse mode of operation, the effective length of the scanning trace of head 8 is increased by 5 H. As a result thereof, a delay of 5 H must be added to the vertical phase synchronizing signal which is supplied to the time base corrector in response to the reproduction of the vertical synchronizing signal v. For a 2× fast motion mode of operation, the effective length of the scanning trace of head 8 along track $T_H$ is shortened by 2.5 H. This means that the vertical phase synchronizing signal which is supplied to the time base corrector in response to the reproduction of the vertical synchronizing signal v must be advanced by 2.5 H. Still further, if the 3× fast motion mode of operation is selected, the effective length of the scanning trace of head 8 along track $T_H$ is shortened by 5 H. This means that the vertical phase synchronizing signal which is supplied to the time base corrector must be advanced by 5 H. The foregoing may be summarized by the following table:

TABLE I

| next track scanned | phase of video information portion in next track |
|---|---|
| $T_H \rightarrow T_H$ | 2.5 delay |
| $T_H \rightarrow T_1$ | normal |
| $T_H \rightarrow T_2$ | 2.5H advance |
| $T_H \rightarrow T_3$ | 5 H delay |
| $T_H \rightarrow T_5$ | 5 H advance |

In the above table, the expressions "delay" and "advance" are relative to the normal time of occurrence of the vertical phase synchronizing signal which is supplied to the time base corrector for the reading out therefrom of the first line in the video information portion of the video signal stored therein.

The above table has been prepared for the operation wherein tape 5 is driven in the direction indicated by arrow a. If the tape is driven in the opposite direction, when the vertical phase synchronizing signal which is supplied to the time base corrector for the reading out therefrom of the first line of the video information portion of the next track to be scanned by head 8 must be advanced or delayed relative to the normal time of occurrence of that vertical phase synchronizing signal in accordance with the following table:

TABLE II

| next track scanned | phase of video information portion in next track |
|---|---|
| $T_H \rightarrow T_H$ | 2.5 H advance |
| $T_H \rightarrow T_1$ | 5 H advance |
| $T_H \rightarrow T_3$ | normal |
| $T_H \rightarrow T_4$ | 2.5 H delay |
| $T_H \rightarrow T_6$ | 5 H delay |

The schematic illustration of tracks T recorded on tape 5, and the relationship between the various scanning traces of head 8 relative to tape 5 for the different special video effects, as shown in FIG. 3, assumes that vertical synchronizing signal v is recorded at the end, or terminating, portion of each track. In some helical scan VTR systems, including some omega-wrap configurations, the vertical synchronizing signal v is not recorded. Rather, the vertical blanking interval d is provided without a separate vertical synchronizing signal. In such an arrangement wherein the vertical synchronizing signal is not recorded, the vertical blanking interval nevertheless is distributed such that most of this vertical blanking interval is provided in the end portion of one track, and the remainder of the vertical blanking interval, for example, the last four line intervals therein (i.e., 4 H) is recorded at the beginning of the next adjacent track. Hence, and as before, each track contains a video information portion which is preceded by the last few line intervals of the vertical blanking interval, and which is followed by the majority of the line intervals included in the vertical blanking interval. Although the vertical synchronizing signal is not recorded, the particular line interval (or intervals) in the recorded frame which normally contains the vertical synchronizing signal can be ascertained merely by counting the horizontal synchronizing signals which are reproduced by head 8 during each scan thereof of a recorded track. Furthermore, once the proper line interval which normally contains the vertical synchronizing signal is ascertained, the proper line interval in the next track, i.e., the next recorded field, can be determined merely by counting 262.5 line intervals, because each field is constituted by 262.5 horizontal line intervals. However, the aforenoted problem of generating a vertical phase synchronizing signal to be supplied to the time base corrector when the effective length of the scanning trace of head 8 is increased or reduced as a function of the selected special video effects is equally applicable to the presently discussed arrangement wherein the recorded horizontal synchronizing signals are counted in order to locate the particular line interval in which the vertical synchronizing signal normally is recorded. This problem is represented by the schematic illustration of tape 5, shown in FIG. 4. Let it be assumed that track $T_a$ is the track which is to be scanned during a normal mode of operation, as well as during the various special video effects modes, such as stop motion, reverse motion or fast motion. It is seen that neither this track nor any of the other recorded tracks on tape 5 contains vertical synchronizing signal v. Nevertheless, it may be assumed that the line interval at point P normally contains the vertical synchronizing signal. This line interval is, of course, included in the vertical blanking interval that is recorded on track $T_a$. This line interval represented by point P can, of course, be detected merely by counting the horizontal synchronizing pulses which are reproduced by head 8 as it scans track $T_a$ during the normal mode of operation or by counting pulses which are synchronized with the reproduced horizontal synchronizing pulses. Once the line interval at point P is detected, it is known that the beginning of the video information portion that is recorded in the next adjacent track $T_b$ is a predetermined number of line intervals away. Thus, if a counter is reset to an initial, reference count when the line interval at point P is detected, and if this counter then is incremented by each horizontal synchronizing signal that is reproduced by head 8 as it continues to scan track $T_a$, or by counting pulses which are synchronized with the reproduced horizontal synchronizing pulses, and then begins its scan of track $T_b$, the first line interval of the video information portion recorded in track $T_b$, identified by point x is reached once this counter has been incremented to a predetermined count. For example, if the counter is reset to a count of zero when head 8 reaches the line interval at point P, this counter will attain a count of 12 when head 8 advances from point P in track $T_a$ to point x in track $T_b$. This, of course, is repeated from one track to the next during the normal mode of operation.

Figure 4:
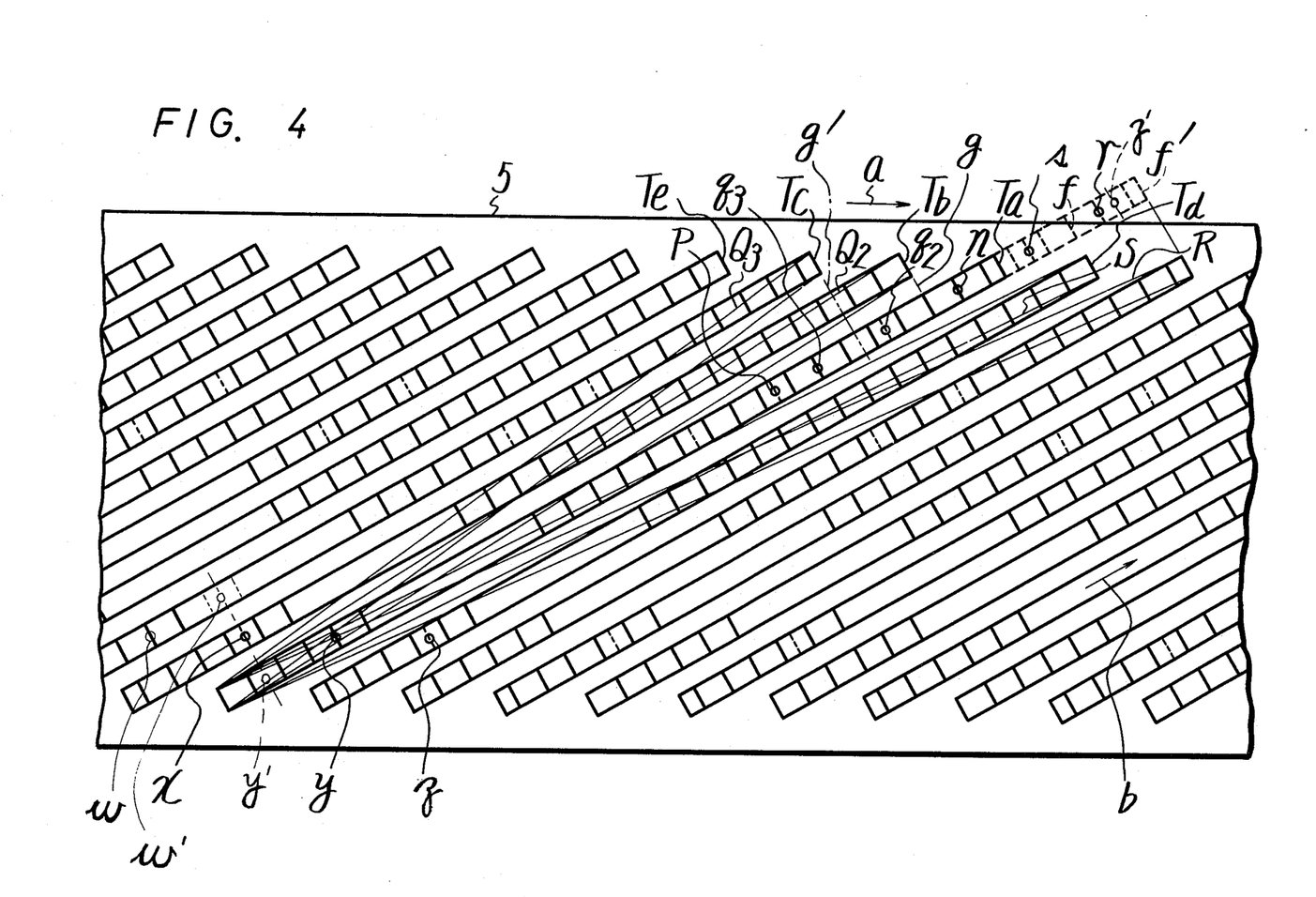
FIG. 4 is a schematic illustration similar to FIG. 3, and also is helpful in understanding the operation of the present invention.

Let it be assumed that the stop motion mode of operation has been selected for the VTR. This means that tape 5 is maintained in its stationary position, and in the absence of dynamic tracking adjustment thereof, head 8 would follow scanning trace S. However, bi-morph support assembly 9 is supplied with a suitable sawtooth-shaped control voltage such that scanning trace S is adjusted into alignment with track $T_a$. Nevertheless, the effective length of the scanning trace of head 8 across track $T_a$ during this stop motion mode of operation is increased beyond its normal effective length to point f. It is seen that the effective length of the scanning trace of head 8 during this stop motion mode of operation exceeds its normal effective length by 2.5 H. If 12 line intervals are counted from the time that head 8 reaches point P, it is appreciated that, because of this extended length of the scanning trace, the count of 12 is obtained when the head reaches the line interval identified at point y'. However, the beginning of the video information portion in track $T_a$ is at point y. Thus, it is seen that, during the stop motion mode of operation, a vertical phase synchronizing signal is supplied to the time base corrector when head 8 reaches point y' and not y; thereby resulting in a vertical displacement in the downward direction of the video picture which ultimately is reproduced during this stop motion mode of operation. It is appreciated that, rather than generating the vertical phase synchronizing signal when head 8 reaches point y', the generation of this signal should be delayed until the head reaches point y.

If the reverse motion mode of operation had been selected for the VTR, head 8 will follow scanning trace R in the absence of dynamic tracking adjustment. However, during this mode of operation, bi-morph support assembly 9 is supplied with a suitable sawtooth-shaped control voltage such that scanning trace R is corrected so as to be in alignment with track $T_a$. Once track $T_a$ has been scanned, the head then commences to scan the preceding track $T_d$ in order to achieve the reverse motion video effect. It is appreciated that when the head follows scanning trace R along track $T_a$, the effective length of the scanning trace is extended beyond its normal length to point f'. Assuming that the aforementioned counter is reset to its initial count when the head reaches point P, this counter will be incremented to the count of 12 when head 8 reaches point z' in track $T_a$. When this count is reached, the vertical phase synchronizing signal will be supplied to the time base corrector so as to read out the first stored line therefrom. During a normal mode of operation, this first read out line will, of course, be the first line of the video information portion. However, and as can be seen from FIG. 4, when head 8 reaches point z', the first line of the video information portion which is recorded in track $T_d$ will not be read out from the time base corrector. Rather, it is necessary that, instead of generating the vertical phase synchronizing signal when head 8 reaches point z', this signal should be delayed until the head reaches point z in track $T_d$ (the next track which is scanned by the head).

If the 2× fast motion mode of operation is selected, head 8 follows scanning trace $Q_2$, in the absence of dynamic correction thereof. However, a suitable sawtooth-shaped control voltage is supplied to bi-morph support assembly 9 such that scanning trace $Q_2$ is brought into alignment with track $T_a$. During this 2× fast motion mode of operation, the effective length of the scanning trace of head 8 along track $T_a$ is shortened to point g. If the aforementioned counter is reset when the head reaches point P, it will be incremented to a count of 12 at the time that head 8, which then scans track $T_c$, reaches point w'. However, the beginning of the video information portion which is recorded in track $T_c$ is represented by point w. If the vertical phase synchronizing signal is supplied to the time base corrector when head 8 reaches point w', that is, when the aforementioned counter has been incremented to a count of 12, the vertical position of the video picture which ultimately is displayed will be displaced. For proper vertical orientation of the video picture, it is necessary that the vertical phase synchronizing signal be advanced so as to occur when head 8 reaches point w instead of point w'.

A similar problem occurs when the 3× fast motion mode of operation is selected. In this mode, head 8 follows scanning trace $Q_3$, in the absence of dynamic correction. This scanning trace is brought into alignment with track $T_a$ when a control voltage of suitable sawtooth-shape is supplied to bi-morph support assembly 9. It is appreciated that, in this 3× fast motion mode, the effective length of the scanning trace of head 8 along track $T_a$ is shortened to the point g'. Hence, if the aforementioned counter is incremented to a count of 12 after head 8 reaches point P, this count will be attained when the head is well within the video information portion that is recorded in track $T_e$ (the next track which is scanned by head 8 during this 3× fast motion mode). It should be recognized that, for proper vertical orientation of the displayed video picture, the vertical phase synchronizing signal which is supplied to the time base corrector should not be supplied when the aforementioned counter attains the count of 12. Rather, an advanced vertical phase synchronizing signal should be supplied.

To summarize the foregoing, during the stop motion mode of operation, the effective length of the scanning trace of head 8 is increased beyond its normal length by 2.5 line intervals (i.e., 2.5 H). If the vertical phase synchronizing signal is referenced to point P, during the stop motion mode of operation, this signal should be delayed by 2.5 H; that is, the aforementioned counter should be incremented by an additional 2.5 horizontal synchronizing pulses, or by an additional 2.5 pulses which are synchronized with the horizontal synchronizing pulses, before the vertical phase synchronizing signal is generated. The effective length of the scanning trace of head 8 during the reverse motion mode of operation exceeds the normal length of the scanning trace by 5 line intervals (i.e., 5 H). Thus, for proper vertical orientation of the displayed video picture, the aforementioned counter should count an additional five pulses before generating the vertical phase synchronizing signal. The effective length of the scanning trace of head 8 during the 2× fast motion mode of operation is less than the normal length thereof by 2.5 line intervals (i.e., 2.5 H). For correct vertical orientation of the displayed video picture, the aforementioned counter should be incremented to a count that is 2.5 pulses less than its normal count before generating the vertical phase synchronizing signal. The effective length of the scanning trace of head 8 during the 3× fast motion mode of operation is less than the normal length thereof by 5 line intervals (i.e., 5 H). For proper vertical orientation of the displayed video picture, the aforementioned counter should be incremented to a count that is 5 pulses less than its normal count before generating the vertical phase synchronizing signal.

Figure 5:
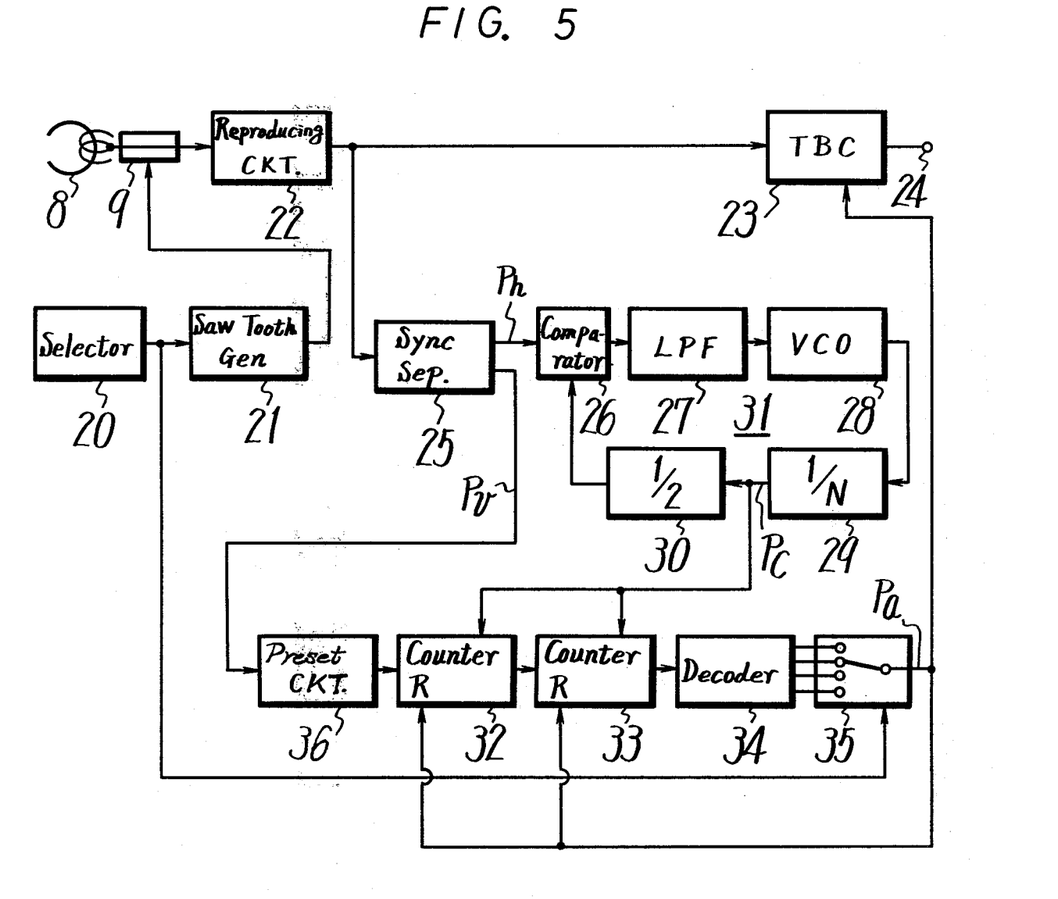
FIG. 5 is a block diagram of one embodiment of the present invention.

The manner in which the vertical phase synchronizing signal which is supplied to the time base corrector, referred to herein as the quasi-vertical synchronizing signal, is selectively delayed or advanced, depending upon the particular special video effects which are selected, now will be described with reference to the apparatus illustrated in FIG. 5. This apparatus functions to generate the quasi-vertical synchronizing signal for the arrangement wherein the actual vertical synchronizing signal v is recorded, as shown in FIG. 3, as well as for the arrangement wherein the vertical synchronizing signal is not recorded, as shown in FIG. 4. The apparatus is shown in combination with a VTR having a video signal reproducing circuit 22, and a time base corrector 23. Since these components are well known to those of ordinary skill in the art, further description thereof is not provided. Suffice it to say that the time base corrector may be of the type which includes a plurality of storage elements, each capable of storing a line of reproduced video signals. The reading out of the stored lines is commenced in response to the quasi-vertical synchronizing signal which is supplied to the time base corrector, resulting in the reading out of the first line of video information at the top of the raster of the displayed video picture.

The illustrated apparatus includes a selector 20, a synchronizing signal separator 25, a phase-locked loop 31, counters 32 and 33, a decoder 34 and a switching circuit 35. Selector 20 may include a manually operable selector switch which is adapted to select various modes of operation of the VTR, such as the recording mode, the normal reproducing mode, and various modes which produce desired special video effects, such as the stop motion mode, the reverse motion mode, the 2× fast motion mode and the 3× fast motion mode. Other special video effects may be selected, as desired; but, for the purpose of the present discussion, only the aforementioned special video effects will be discussed. Selector 20 is coupled to a sawtooth generator 21 which is adapted to generate a suitable sawtooth-shaped control voltage that is supplied to bi-morph support assembly 9. The particular shape of this control voltage, for example, the amplutide and polarity thereof, is a direct function of the selected mode of operation. The purpose of this control voltage is, of course, to control the deflection of the bi-morph support assembly such that, regardless of the selected mode of operation, the scanning trace of head 8 is brought into alignment with the particular track then being scanned thereby. The construction of an appropriate sawtooth generator is known to those of ordinary skill in the art and, in the interest of brevity, is not described herein.

Synchronizing signal separator 25 is coupled to reproducing circuit 22 and is adapted to separate the horizontal synchronizing signal $P_h$ in the vertical synchronizing signal $P_v$ from the reproduced video signal. It may be assumed, initially, that the VTR is used with the recorded track arrangement shown in FIG. 3 wherein the actual vertical synchronizing signal v is recorded. The separated horizontal synchronizing signals $P_h$ are supplied to phase-locked loop 31. This phase-locked loop includes a voltage controller oscillator (VCO) 28 which generates a train of higher frequency pulses having the frequency $2Nf_h$, i.e., 2N times the horizontal synchronizing frequency. A frequency divider 29, having the dividing ratio 1/N, is coupled to the output of VCO 28 to generate timing pulses $P_c$ having the frequency $(2N/N)f_h = 2f_h$. These timing pulses $P_c$ are supplied to counters 32 and 33 and are adapted to be counted thereby. These timing pulses are supplied to a further frequency divider 30 having the dividing ratio ½. Hence, the frequency of the pulses derived at the output of frequency divider 30 is equal to $f_h$, i.e., the horizontal synchronizing frequency. These frequency-divided pulses derived from frequency divider 30 are supplied to a comparator 26 whereat they are compared to the separated horizontal synchronizing signal $P_h$. Comparator 26 may comprise, for example, a phase comparator. In the event of any phase error between the frequency-divided pulses produced by frequency divider 30 and the separated horizontal synchronizing signal $P_h$, comparator 26 generates an error signal. This error signal is filtered by low pass filter 27 and is supplied as a frequency control voltage to VCO 28. Thus, and as is conventional, phase-locked loop 31 functions to synchronize the frequency and phase of the pulses generated by VCO 28 to the frequency and phase of the separated horizontal synchronizing signal $P_h$. As a result of this phase-locking synchronism, timing pulses $P_c$ also are synchronized in phase and frequency to the reproduced horizontal synchronizing signal.

The separated vertical synchronizing signal $P_v$, produced by synchronizing signal separator 25, is supplied to a preset circuit 36. This preset circuit is coupled to a "load" input of counter 32 and is adapted to load this counter with a preset count in response to the separated vertical synchronizing signal $R_v$. For the purpose of the present discussion, it may be assumed that this preset count is equal to a count of 512. Counter 32 is adapted to produce an enable output signal when the count thereof either has been preset to a count of 512 or has been incremented to this count in response to the counting of timing pulses $P_c$. Counter 33 includes an enable input coupled to counter 32 so as to receive the enable output therefrom. Once enabled by this enable output, counter 33 is adapted to count the timing pulses $P_c$ which are supplied thereto.

Decoder 34 is coupled to counter 33 and is adapted to decode predetermined counts of this counter. The decoder includes a plurality of individual outputs, each of which is supplied with an output signal when decoder 34 decodes the corresponding predetermined counts of counter 33. It is assumed that these predetermined counts are the counts of 3, 8, 13, 18 and 23. Accordingly, and as an example, an output signal is produced at the top-most output of decoder 34 when counter 33 attains a count of 23. An output signal is produced at the next output of decoder 34 when counter 33 attains a count of 18. An output signal is produced at the next lower output of decoder 34 when counter 33 attains a count of 13. Finally, an output signal is produced at the lower-most output of decoder 34 when counter 33 attains a count of 8. Although not shown herein, decoder 34 may include yet another output at which an output signal is produced when counter 33 attains a count of 3.

Switching circuit 35 includes a plurality of inputs connected to respective ones of the outputs of decoder 34. This switching circuit additionally includes an output terminal which is selectively connected to any one of its inputs, in accordance with the particular mode of operation which has been selected by selector 20. In this regard, selector 20 is shown as being connected to a control input of switching circuit 35 so as to represent that a corresponding input of switching circuit 35 is connected to the output terminal thereof depending upon the particular reproducing mode of operation (e.g. normal, stop motion, reverse motion or fast motion) which has been selected. The output terminal of switching circuit 35 provides the quasi-vertical synchronizing signal $P_a$. This quasi-vertical synchronizing signal is supplied to time-base corrector 23 to function as the vertical phase synchronizing signal, discussed above, and also is supplied to the reset inputs of counters 32 and 33.

The operation of the apparatus illustrated in FIG. 5 now will be described. Let it be assumed, for the purpose of the present description, that a vertical synchronizing signal v is recorded in each record track. Let it be further assumed that when head 8 reaches the pre-established location in the track then being scanned thereby in which the vertical synchronizing signal v is recorded, that this vertical synchronizing signal is reproduced. Referring to the schematic illustration of FIG. 4, it is additionally assumed that this pre-established location corresponds to point P in track $T_a$. That is, when head 8 reaches point P, the vertical synchronizing signal is reproduced and is separated from the video signal by synchronizing signal separator 25 as vertical synchronizing signal $P_v$.

Initially, let it be assumed that selector 20 selects the normal reproducing mode of operation. This selection results in connecting the output terminal of switching circuit 35 to the input thereof which is supplied with a signal when decoder 34 decodes a count of 13 attained by counter 33. When the VTR reproduces the recorded vertical synchronizing signal, the separated vertical synchronizing signal $P_v$ is supplied to preset circuit 36 which loads the preset count of 512 into counter 32. Initially, counter 33 had been reset to an initial count, for example, a count of zero. Now that counter 32 is preset with the count of 512, which occurs when head 8 reaches point P in track $T_a$, counter 33 is enabled to be incremented by timing pulses $P_c$. These timing pulses are synchronized with, and twice the frequency of, the horizontal synchronizing signal $P_h$ which is separated from the reproduced video signals by synchronizing signal separator 25. Thus, counter 33 is incremented by two timing pulses $P_c$ for each horizontal line interval that is scanned by head 8.

As shown in FIG. 4, when head 8 advances from point P to a point n, a total of 6.5 line intervals will have been traversed by the scanning head. This means that, at point n, counter 33 will attain the count of 13. At that time, this count of 13 is decoded by decoder 34 which, in turn, supplies an output signal to switching circuit 35. Selector 20 had been operated such that the output terminal of switching circuit 35 is connected to the input thereof which receives the signal from decoder 34 when the count of 13 is decoded. Thus, when head 8 reaches point n during the normal mode of operation, a quasi-vertical synchronizing signal $P_a$ is supplied from switching circuit 35 to time base corrector 23. This quasi-vertical vertical synchronizing signal $P_a$ also resets counters 32 and 33 to their respective, initial (e.g. zero) counts. Time base corrector 23 is adapted to read out the lines of video signals which are stored therein at a predetermined time following receipt of this quasi-vertical synchronizing signal. Thus, when head 8 reaches point x in the track $T_b$ scanned thereby, the beginning of the video information portion stored in time base corrector 23 is read out therefrom. In the example shown in FIG. 4, time base corrector 23 initiates its read-out operation at 5.5 line intervals (i.e., 5.5 H) following the quasi-vertical synchronizing signal.

Let it now be assumed that selector 20 selects the stop motion mode of operation. Accordingly, switching circuit 35 is operated such that the output terminal thereof is connected to the input which is supplied with a signal from decoder 34 when the decoder decodes a count of 18. Once again, when head 8 reaches point P in track $T_a$ (FIG. 4), the separated vertical synchronizing signal $P_v$ is supplied to preset circuit 36 which loads counter 32 with the preset count of 512. Counter 33 now is enabled to count the timing pulses $P_c$ which are supplied thereto. From FIG. 4, it is seen that counter 33 attains the count of 18 when head 8 reaches point s. This point is 1.5 line intervals (i.e., 1.5 H) from the end f of the stop motion scanning trace of head 8 along track $T_a$. The count of 18 attained by counter 33 is decoded by decoder 34 and supplied to the input of switching circuit 35. Since switching circuit 35 has been controlled such that its output terminal now is connected so as to receive this signal from the decoder, it is seen that, when head 8 reaches point s, the quasi-vertical synchronizing signal $P_a$ is supplied to time base corrector 23, and also to the reset inputs of counters 32 and 33. From FIG. 4, it also is seen that head 8 reaches point y, i.e., the beginning of the video information portion which is recorded in track $T_a$, at 5.5 line intervals (i.e., 5.5 H) following point s. It also is seen that the quasi-vertical synchronizing signal which is generated when head 8 reaches point s is delayed from the normal quasi-vertical synchronizing signal which is generated when head 8 reaches point n by 2.5 line intervals (i.e., 2.5 H). This delay in the quasi-vertical synchronizing signal results in proper vertical orientation of the displayed video picture.

The apparatus illustrated in FIG. 5 operates in a manner similar to that discussed hereinabove when the other special video effects are selected. Thus, when the reverse motion mode of operation is selected, the output terminal of switching circuit 35 is connected to the input thereof so as to receive a signal from decoder 34 when the decoder decodes a count of 23. During the reverse motion mode, the scanning trace of head 8 along track $T_a$ extends to point f'. Counter 33, which is enabled to commence its counting of timing pulses $P_c$ when head 8 reaches point P, attains the count of 23 when the head reaches point r. This count is decoded by decoder 34 and switching circuit 35 receives a signal from the decoder so as to produce the quasi-vertical synchronizing signal $P_a$ when head 8 reaches point r. Thus, the quasi-vertical synchronizing signal during the reverse motion mode of operation is delayed from the quasi-vertical synchronizing signal during the normal mode of operation by 5 line intervals (i.e., 5 H). This assures proper vertical orientation of the displayed video picture.

When the 2× fast motion mode of operation is selected, the output terminal of switching circuit 35 is connected to the input thereof which is supplied with a signal from decoder 34 when the decoder decodes a count of 8 attained by counter 33. Referring again to FIG. 4, counter 33 is enabled when head 8 reaches point P, and the counter attains a count of 8 when the head reaches point $q_2$. At that time, this count is decoded by decoder 34 to supply a signal to switching circuit 35. Hence, the switching circuit generates the quasi-vertical synchronizing signal $P_a$ when head 8 reaches point $q_2$, thereby advancing the quasi-vertical synchronizing signal by 2.5 line intervals (i.e., 2.5 H) from the time that the quasi-vertical synchronizing signal is generated during the normal mode of operation.

Finally, if the 3× fast motion mode of operation is selected, the output terminal of switching circuit 35 is connected to the input thereof which is supplied with a signal from decoder 34 when the decoder decodes a count of 3. Counter 33, which again is enabled when head 8 reaches point P, is incremented to a count of 3 at the time that head 8 reaches point $q_3$. At that time, this count is decoded; and switching circuit 35 generates the quasi-vertical synchronizing signal $P_a$. From FIG. 4, it is seen that the quasi-vertical synchronizing signal which is generated when head 8 reaches point $q_3$ is advanced by 5 line intervals (i.e., 5 H) relative to the quasi-vertical synchronizing signal which is generated during the normal mode of operation when the head reaches point n.

In all of the foregoing assumptions, it should be recognized that the quasi-vertical synchronizing signal is generated at a fixed, predetermined time prior to the time that head 8 reaches the beginning of the video information portion in the next track which is scanned thereby. That is, during the normal mode of operation, the quasi-vertical synchronizing signal is generated when head 8 reaches point n which is a fixed time prior to head 8 reaching point x. During the stop motion mode of operation, the quasi-vertical synchronizing signal is generated when head 8 reaches point s, which is the same fixed time prior to the reaching of point y by the head. During the reverse motion mode, the quasi-vertical synchronizing signal is generated when head 8 reaches point r, which is the same fixed time prior to the reaching of point z of the head. During the 2× fast motion of operation, the quasi-vertical synchronizing signal is generated when head 8 reaches point $q_2$, which is the same fixed time prior to reaching point w by the head. Thus, regardless of the selected special video effects, and thus, regardless of the effective length of the scanning trace of head 8 along track $T_a$, the quasi-vertical synchronizing signal is generated at the same time relative to the beginning of the video information portion which is reproduced during the next following scanning trace of the head.

In the foregoing description, it is assumed that the vertical synchronizing signal v is recorded and reproduced from the record tracks. When this reproduced vertical synchronizing signal is separated, it activates preset circuit 36 to load the preset count of 512 into counter 32. Nevertheless, the apparatus illustrated in FIG. 5 operates in the same manner as that just described even if the vertical synchronizing signal is not recorded. In that event, it is appreciated that counter 32, as well as counter 33, is reset in response to the quasi-vertical synchronizing signal $P_a$. Once reset, counter 32 is incremented from its zero count by the timing pulses $P_c$. When a count of 512 is attained, it is seen that a total of $512/2 = 256$ line intervals (i.e., 256 H) will have been scanned by head 8. During the normal mode of operation, the quasi-vertical synchronizing signal is generated when head 8 reaches point n. At 256 line intervals (i.e., 256 H) later, head 8 will reach point P. At that time, counter 32 is incremented to the count of 512 so as to enable counter 33 to count timing pulses $P_c$. After 13 such timing pulses are counted, that is, when head 8 once again reaches point n, the quasi-vertical synchronizing signal is generated. It may be appreciated that the quasi-vertical synchronizing signal which is generated during the normal mode of operation has the period equal to the total count attained by counters 32 and 33 before such counters are reset. That is, during the normal mode of operation, the quasi-vertical synchronizing signal $P_a$ has the period of $$\frac{512 + 13}{2} H = 262.5 H.$$

During the stop motion mode of operation, the quasi-vertical synchronizing signal $P_a$ is generated when head 8 reaches point s. This resets counter 32 to commence counting timing pulses $P_c$. When head 8 reaches point P, 512 timing pulses $P_c$ will have been counted. Counter 33 then is enabled to count 18 timing pulses $P_c$, whereupon head 8 reaches point s and the quasi-vertical synchronizing signal is generated once again. During the stop motion mode of operation, the effective length of the scanning trace of head 8 along track $T_a$ is extended by 2.5 line intervals (i.e., 2.5 H). The period of the quasi-vertical synchronizing signal $P_a$ which is generated during this stop motion mode of operation is equal to the counts attained by counters 32 and 33. This period is equal to $$\frac{512 + 18}{2} H = 265 H.$$

This extended period corresponds to the extended length of the scanning trace of head 8.

Although not described herein, it now should be appreciated that during the reverse motion mode of operation, the period of the quasi-vertical synchronizing signal is equal to 267.5 line intervals (i.e., 267.5 H); the period of the quasi-vertical synchronizing signal during the 2× fast motion mode of operation is reduced to 260 line intervals (i.e., 260 H); and the period of the quasi-vertical synchronizing signal during the 3× fast motion mode of operation is reduced to 257.5 line intervals (i.e., 257.5 H). In each of these operations, counter 32 is incremented from a count of 0 to a count of 512 so as to then enable counter 33. The count attained by counter 33 and which is decoded by decoder 34 to produce the quasi-vertical synchronizing signal is selected to be either greater than normal or less than normal, depending upon the particular mode of operation which is selected by selector 20. That is, the decoded count either is greater-than-normal or less-than-normal depending upon the effective length of the scanning trace of head 8 as it scans along track $T_a$.

While the present invention has been particularly shown and described with reference to a preferred embodiment, it should be readily apparent to those of ordinary skill in the art that various changes and modifications in form and details may be made without departing from the spirit and scope of the invention. For example, counters 32 and 33 may be combined into a single counter. As another alternative, decoder 34 may be controlled by selector 20 so as to decode a single particular count depending upon the mode of operation which has been selected. For example, decoder 34 may be operated so as to detect when counter 33 reaches a count of 13 during normal operation, a count of 18 during stop motion, a count of 23 during reverse motion, and so on. This would avoid the need for switching circuit 35. Still further, although the helical scan VTR shown herein has been described as the omega-wrap type, it should be apparent that, if desired, the VTR may include two rotary heads, and the tape-wrap configuration need not be limited solely to the omega-wrap arrangement. Still further, although the present invention has been described with reference to the NTSC system, it should be appreciated that other conventional television systems, such as the PAL and SECAM systems also can be used. Still further, the special video effects with which the present invention can be used need not be limited solely to those which have been discussed above. Rather, the quasi-vertical synchronizing signal which is generated by the present invention is selectively delayed or advanced depending upon the effective length of the scanning trace of the head along the track then being scanned thereby.

It is intended that the appended claims be interpreted to include the foregoing and various other changes and modifications.

What is claimed is:

1. Apparatus for use with a helical scan video tape reproducer (VTR) of the type having a magnetic head for scanning slant tracks, to generate a quasi-vertical synchronizing signal during the production of special video effects, such as stop motion, fast motion and reverse motion wherein the effective length of the scanning trace of said magnetic head differs from the length of the track being scanned thereby, such that said quasi-vertical synchronizing signal is produced when said magnetic head is at a predetermined location relative to the beginning of the scanning trace thereof as said head scans said track, said apparatus comprising means for controlling the tracking position of said head; means for sensing when said head reaches a pre-established location in the track being scanned thereby; means for selecting a particular track to be scanned next; and means for generating a delayed signal delayed from the time that said head reached said pre-established location, the delayed time being selectable as a function of the selected particular track to be scanned next and said delayed signal constituting said quasi-vertical synchronizing signal and being produced when said magnetic head is at the same predetermined location relative to the beginning of the next-following scanning trace thereof regardless of the effective length of said scanning trace.

2. The apparatus of claim 1 wherein a vertical blanking interval is recorded at the end portion of said recorded track, and said pre-established location is within said vertical blanking interval.

3. Apparatus for use with a helical scan video tape reproducer (VTR) to generate a quasi-vertical synchronizing signal during the reproduction of special video effects, such as stop motion, fast motion and reverse motion, such that said quasi-vertical synchronizing signal is produced when a magnetic head is at a predetermined location relative to the scanning trace thereof as said head scans a slant track having a vertical blanking interval recorded at the end portion of said track and wherein a vertical synchronizing signal is recorded within the recorded vertical blanking interval; said apparatus comprising means for controlling the tracking position of said head; signal reproducing means for reproducing the signals reproduced from said track by said magnetic head; vertical synchronizing signal detecting means for detecting the reproduced vertical synchronizing signal; means for selecting a particular track to be scanned next; and means for generating a delayed signal delayed from the time that said vertical synchronizing signal is reproduced, the delayed time being selectable as a function of the selected particular track to be scanned next and said delayed signal constituting said quasi-vertical synchronizing signal.

4. The apparatus of claim 3 wherein said means for generating a delayed signal comprises a source of timing pulses; counting means enabled by the detection of said reproduced vertical synchronizing signal to count said timing pulses; decoder means coupled to said counting means for generating respective delayed signals when said counting means attains respective pre-determined counts; and selecting means for selecting one of said delayed signals in accordance with the selected track to be scanned next.

5. The apparatus of claim 4 wherein said source of timing pulses comprises phase locked loop means synchronized with horizontal synchronizing signals reproduced from said recorded track by said magnetic head to generate timing pulses of a frequency twice the frequency of said reproduced horizontal synchronizing signals.

6. Apparatus for use with a helical scan video tape reproducer (VTR) to generate a quasi-vertical synchronizing signal during the production of special video effects, such as stop motion, fast motion and reverse motion, such that said quasi-vertical synchronizing signal is produced when a magnetic head is at a predetermined location relative to the scanning trace thereof as said head scans a slant track having horizontal synchronizing signals recorded therein, said apparatus comprising means for controlling the tracking position of said head; separating means for separating the horizontal synchronizing signals reproduced by said magnetic head; phase locked loop means synchronized with said reproduced horizontal synchronizing signals to generate timing pulses; timing means for counting said timing pulses and to generate an output signal when a predetermined count is reached; means for selecting a particular track to be scanned next; and means for generating a delayed signal delayed from the time that said output signal is generated, the delayed time being selectable as a function of the selected particular track to be scanned next and said delayed signal constituting said quasi-vertical synchronizing signal.

7. The apparatus of claim 6 wherein said means for generating a delayed signal comprises counting means responsive to said output signal for counting said timing pulses; decoder means coupled to said counting means for generating respective delayed signals when said counting means attains respective preselected counts; and selecting means for selecting one of said delayed signals in accordance with the selected track to be scanned next.

8. The apparatus of claim 5 or 7 wherein said selecting means comprises switch means for selecting a predetermined one of said delayed signals that is generated at a normal count of said counting means when the effective length of the scanning trace of said magnetic head is equal to its normal effective length, for selecting a delayed signal that is generated at lower than normal counts of said counting means when the effective length of the scanning trace of said magnetic head is less than its normal effective length, and for selecting a delayed signal that is generated at higher than normal counts of said counting means when the effective length of the scanning trace of said magnetic head is greater than its normal effective length.

9. For use with a helical-scan video tape reproducer (VTR) having at least one playback head driven to scan successive recorded slant tracks on a video tape, said recorded tracks having video signals recorded therein, said video signals including horizontal synchronizing signals and a video information signal portion, comprised of line intervals of video information with a field interval of video signals recorded in a track, in combination with a time base corrector coupled to said VTR for removing time base errors from the video signals reproduced by said VTR, said VTR being controllable to produce selected special video effects, such as stop motion, fast motion and reverse motion, by selecting which of the recorded tracks are scanned successively and including means for controlling the tracking position of said at least one playback head, and wherein the effective length of the scanning trace of said head with respect to a recorded track varies from its normal length with respect thereto during the production of special video effects, apparatus for supplying a reference phase signal to said time base corrector for synchronizing the output signal from said time base corrector such that the video picture derived from said output signal exhibits constant vertical alignment, said apparatus comprising means for generating a normal reference signal when said head reaches a predetermined location in the track being scanned thereby during a normal reproducing operation of said VTR, said predetermined location being spaced from the beginning of said video information signal portion in the next track scanned by said head by a predetermined number of line intervals; means for generating a reference phase signal during a special video effects reproducing operation of said VTR, said reference phase signal being delayed with respect to said normal reference signal when said effective length of the scanning trace of said head is greater than said normal length and said reference phase signal being advanced with respect to said normal reference signal when said effective length of the scanning trace of said head is less than said normal length, said reference phase signal being spaced from the beginning of said video information signal portion in the next track scanned by said head by said predetermined number of line intervals; and means for supplying said reference phase signal to said time base corrector.

10. The apparatus of claim 9 wherein said means for generating a reference phase signal comprises separating means for separating the horizontal synchronizing signal reproduced by said head; phase locked loop means for generating timing pulses synchronized to the separated horizontal synchronizing signals; counting means for counting said timing pulses; means for detecting when a preselected count of said counting means is reached to generate said reference phase signal, said preselected count being a function of the selected recorded track to be scanned next; and means responsive to said reference phase signal for resetting said counting means to an initial count.

11. The apparatus of claim 10 wherein said counting means comprises a first counter, resettable to an initial count in response to said reference phase signal, for counting said timing pulses until a first count is reached, said first count corresponding to said predetermined location of said head in the track being scanned thereby, said first counter being settable to said first count in response to the reproduction of a vertical synchronizing signal by said head; and a second counter, resettable to an initial count in response to said reference phase signal, and enabled by said first count for counting said timing pulses until a second count is reached, said second count being determined by the effective length of the scanning trace of said head with respect to the track being scanned thereby, said second count being used to generate said reference phase signal.

12. The apparatus of claim 11 wherein said means to generate said reference phase signal comprises decoding means coupled to said second counter for producing selected decoded outputs when said second counting means reaches selected counts, said selected counts being a predetermined normal count, selected less-than-normal counts and selected greater-than-normal counts; and switch means coupled to said decoding means for supplying a particular less-than-normal count as a function of said effective length of the scanning trace of said head when said effective length of the scanning trace of said head is less than normal, and for supplying a particular greater-than-normal count as a function of said effective length of the scanning trace of said head when said effective length of the scanning trace of said head is greater than normal.

13. The apparatus of claim 12 wherein said switch means is operative to supply said normal count as said normal reference signal when said VTR is operative in its normal reproducing operation.

* * * * *